Nov. 12, 1963     W. E. WAY ETAL     3,110,401
ARTICLE DIVERSION SYSTEM
Filed May 25, 1961     3 Sheets-Sheet 1
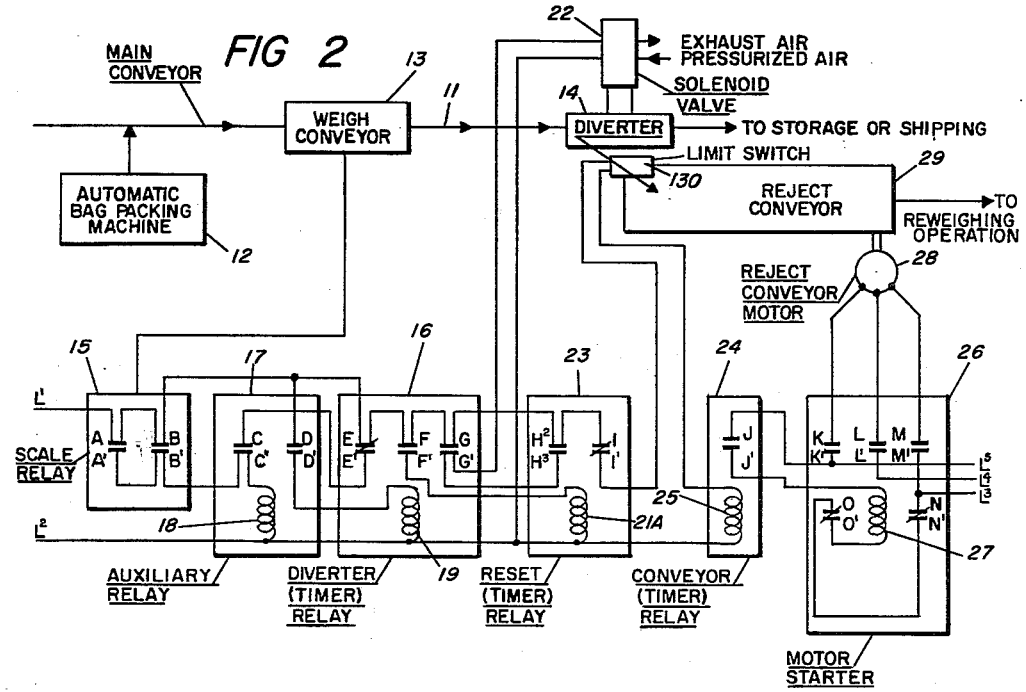
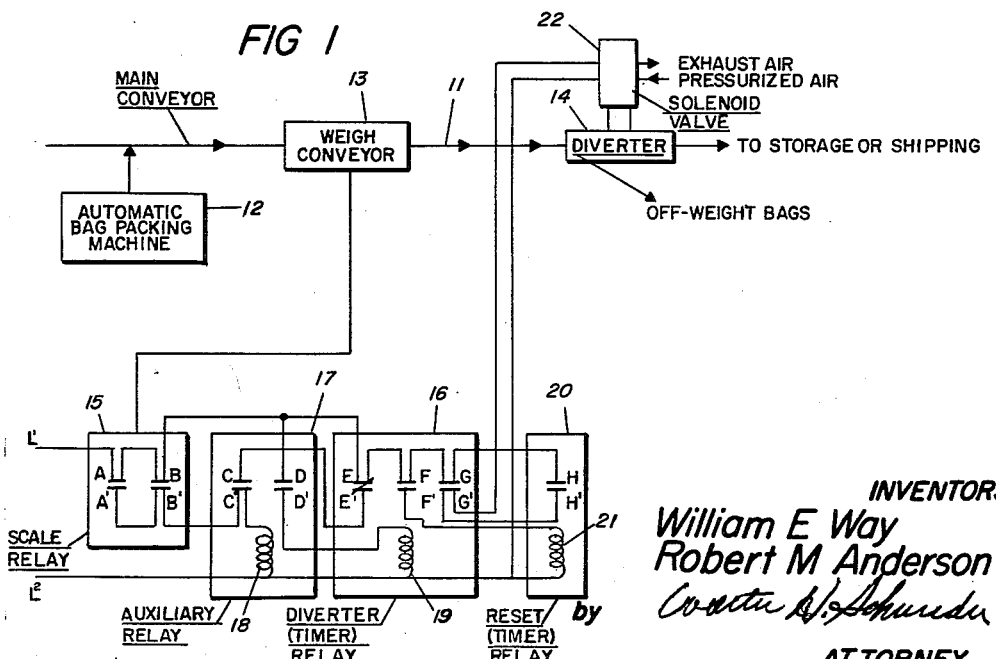
INVENTORS
William E Way
Robert M Anderson
ATTORNEY 3,110,401
ARTICLE DIVERSION SYSTEM
William E. Way and Robert M. Anderson, Houston, Tex., assignors, by mesne assignments, to Ashland Oil & Refining Company, Ashland, Ky., a corporation of Kentucky
Filed May 25, 1961, Ser. No. 112,691
5 Claims. (Cl. 209—121)

This invention relates to grading apparatus.

It is an object of this invention to provide means for measuring a selected property of a succession of articles moving along a conveyer and for automatically removing from said conveyer without interruption of its operation those articles which deviate from the maximum and minimum acceptable limits of said property. A further object of this invention is to provide means for continuously and automatically weighing articles carried on a conveyer. Another object of this invention is to provide apparatus for automatically weighing articles moving upon a conveyer and for removing from the conveyer without interruption of its operation any of said articles which deviate from a predetermined weight standard. Still another object of this invention is to provide an article diverter for rapidly and positively engaging an article on a conveyer and rapidly removing said article therefrom. A further object of this invention is to provide improved diverting apparatus for transferring an article from one conveyer to another machine.

The products of many industries, such as those made by chemical and cement manufacturers, are most frequently sold by weight. In the carbon black industry, for instance, it has been customary to sell the black in reinforced paper bags having a packed weight of fifty pounds or more. At an early stage in the development of packing procedures in this and other industries producing dry products, it was customary to place an empty bag on a scale beneath a delivery pipe and then to allow product to flow through the pipe into the bag until the scale read fifty pounds or whatever weight was desired for the particular size of bag. The delivery pipe was then closed off. The bag was then removed from the scale, sealed and removed from the weighing area to storage or shipping departments.

The advent of high-speed automatic forced-feed packaging machinery has eliminated the necessity for filling bags and other types of containers by hand since such machinery is capable of repeatedly measuring and discharging the same predetermined weight, volume or quantity of material into each of a series of bags or other containers. Although modern packing machines are generally quite dependable, they do suffer from occasional malfunctions and gradual variations in their accuracy. If over-filled packages are sold consistently, the manufacturer suffers an unnecessary loss. Under-filled packages, if detected by customers, undoubtedly cause ill-will. Therefore it is desirable to check the weight of each automatically packed container or package in order to prevent the losses of revenue and customer dissatisfaction accruing from over-filling and under-filling, respectively.

It is desirable for a number of reasons that the check-weighing of heavy bags of carbon black be carried out automatically. Firstly, the automatic bag filling machines currently available operate rapidly enough so that one or more men would be required to work continuously in order to check each bag packed by one such machine. Secondly, the material measuring facilities of such machines are sufficiently dependable so that the number of malfunctions per typical day of operation is small. Therefore the men who might be employed in the manual weight checking operation would be devoting a high percentage of their time to non-productive activity since only a very small proportion of the bags they handle actually require their attention. Further, the manual handling of fifty-pound bags of cement, carbon black or any other material is a back-breaking chore which will quickly tire the strongest laborers and seriously impair their efficiency. Automatic weight checking devices with automatic off-weight bag rejection means would make such laborers available for more productive work.

We have found it possible to fulfill the above objects and needs by providing an off-weight article diversion system which may best be understood by reference to the accompanying specification and drawings, which are only illustrative of the invention and by reference to the appended claims which define the scope thereof. In the drawings:

FIGURE 1 is a schematic diagram of the basic control system, source machine, weight detection means and diverter mechanism;

FIGURE 2 schematically represents a variation on the basic control system for use with a reject conveyer to receive diverted articles from the diverter mechanism;

Figure 3:
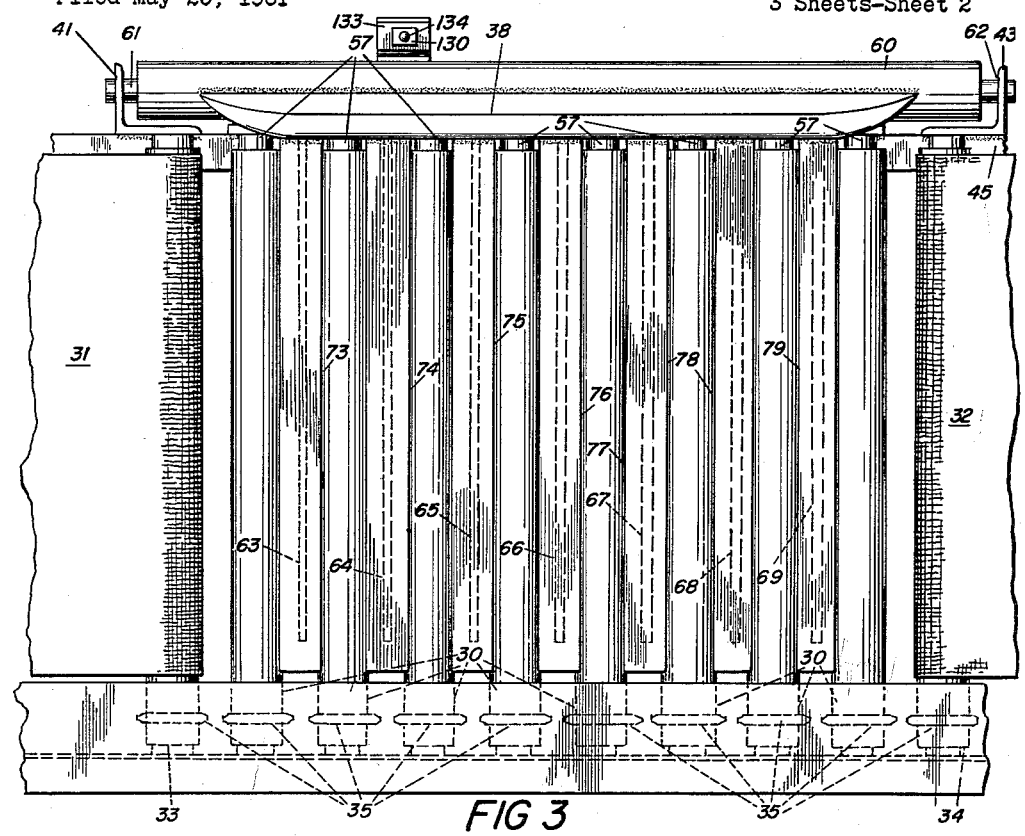
FIGURE 3 is a top plan view of the diverter mechanism and a portion of the conveyer system.

Referring now to FIGURE 1 in particular, it will be observed that a main conveyer 11 is fed by an automatic packing machine 12 and that a weigh conveyer 13 is interposed between the packing machine 12 and the diverter mechanism 14. The diverter 14 is operatively associated with the main conveyer 11 in such a manner as to receive packages of proper weight at its upstream end and discharge them at its downstream end to a storage or shipping location. The diverter may be of any of the well-known types such as for instance one of those shown in pages 97–100 of the April 1960 issue of Modern Materials Handling Magazine. We have found, however, that excellent results can be obtained by a novel type of diverter mechanism which will be explained hereinafter. When an off-weight bag or other article is detected, the automatic control system described below automatically actuates the diverter to reject said off-weight bag and prevent it from reaching the storage or shipping location along with bags of proper weight.

The automatic control circuit may be understood most easily by considering that it is composed of four basic components, a detector, switch means, auxiliary relay means and a diverter-timer-relay. The detector includes a weighing device such as a weighing conveyer and co-operates with the switch means, for example the scale relay 15. The weigh conveyer 13 may be selected from any of the well-known commercial models currently available and may be linked to the scale relay by direct mechanical connection or by means of an electric, pneumatic, hydraulic or other type of remote signaling system.

The scale relay 15 has overweight poles A—A′ and underweight poles B—B′. The weigh conveyer and the means for linking it to the scale relay should be such that the presence of an overweight bag on the weigh conveyer will cause the contacts A—A′ to close automatically. Said weigh conveyer and linking means should be capable of closing contacts B—B′ whenever an underweight package is present upon weigh conveyer 13.

It is contemplated that the term scale relay should be construed broadly enough to cover not only electrical relays but also any switch means comprising one or more sets of contacts driven by any suitable device able to translate data from the weigh conveyor into operating forces for opening and closing said contacts. Such an expanded construction of the term scale relay is proper because the exact structure and modus operandi of the weigh conveyor, linking means and especially the scale relay, are unimportant. Their sole function is to intermittently transmit an electrical current of sufficient duration to initiate the operation of the diverter (timer) relay component of the control system whenever an off-weight package passes the weight determination point. It should be evident that the specific structure of the weigh conveyer, linking means and scale relay does not contribute to nor limit the essence of the present invention. For example, there would be no invention or departure from the spirit of this invention in providing scale relay 15 with only a single pair of contacts instead of two pairs and adapting said single pair of contacts to close whenever either an overweight or underweight package is detected by the weigh conveyer. Various types of weigh conveyers and relays are available as manufactured items.

For reasons not essential to an understanding of the present invention we prefer to utilize a scale relay having two separately operable pairs of contacts for overweight and underweight conditions and have therefore illustrated the scale relay in that manner. In the scale relay as shown, primary contacts A and B are short circuited. The same is true of the secondary contacts A' and B'. The weigh conveyer should be adapted to close contacts A—A' when it is traversed by an overweight bag and to close contacts B—B' when it is traversed by an underweight bag.

The timer-relay component actually includes two relays in this embodiment of my invention: a diverter (timer) relay 16 and an auxiliary relay 17. The function of the diverter (timer) relay is to delay operation of the diverter mechanism from the time an off-weight package crosses the weigh conveyer until the time when said off-weight package reaches the diverter mechanism in the natural course of its movement along the conveyer belt. Since the main conveyer moves at constant speed, the time delay is always the same.

The need for the auxiliary relay 17 arises out of the fact that in most applications of the invention, the scale relay will remain closed only so long as an off-weight package is present upon the weigh conveyer. Without the aid of auxiliary relay 17 the energizing circuit for diverter (timer) relay 16 would be broken as soon as the off-weight package left the conveyer. This is true because said energizing circuit would be required, in the absence of auxiliary relay 17, to pass through contacts A—A' or B—B'. But contacts A—A' and B—B' are normally open and incapable of carrying current to relay 16 subsequent to departure of the off-weight bag from conveyor 13. Therefore, the auxiliary relay serves the function of maintaining the flow of current to the divertertimer relay during the time period between the departure of the off-weight package from the weight conveyer and the time when such a package reaches the diverter.

The relay 17 is of the double pole, single throw type and is normally open. It is provided with an energizing coil 18 and an armature (not shown) which operates the movable contacts in the well-known manner. The relay 17 is provided with primary contacts C and D and secondary contacts C' and D'.

The diverter (timer) relay 16 is of the triple pole, single throw variety. It has a delayed operation feature and is provided with energizing coil 19, primary contacts E, F and G and secondary contacts E', F' and G'. Contacts E—E' are normally closed, while the contacts F—F' and G—G' are normally open. In this relay the time delay feature has the effect of delaying the closing of normally open contacts F—F' and G—G' from the moment relay 16 is first energized throughout a time interval equal to the travel time of a package moving on the main conveyer from the weigh conveyer to the diverter mechanism. Contacts E—E' are opened simultaneously with or almost immediately after the closing of contacts F—F' and G—G'. To avoid the possibility of jamming the control system by feeding it several off-weight packages in rapid succession, it is desirable that the relay 16 function and reset as quickly as possible. Specifically, it is desirable that as soon as the delay period has expired, contacts E—E' should open and contacts F—F' and G—G' should close only briefly, almost instantaneously returning to normal position.

The operation of the diverter mechanism is governed by the reset (timer) relay 20 which is of the single pole, single throw, normally open variety. The relay 20 is adapted to close its primary and secondary contacts H and H' immediately upon energization of its coil 21 and to reopen said contacts automatically after a predetermined interval of time. Said predetermined interval of time is at least as long as is necessary to supply all the pressurized air that is necessary through a solenoid valve 22 to completely cycle the diverter mechanism, which is powered by a pneumatic cylinder (see FIGURE 3).

The circuitry of the control system can be relatively simple. For example, in this embodiment of our invention, the operating coils 18, 19 and 21 of the relays 17, 16 and 20 respectively, are connected in parallel through the various relays with both sides L' and L² of a supply line. The primary and secondary contacts of the relay 15 are shorted, the primary contacts A and B being connected directly to normally open contact D of the relay 17 and to normally closed contact E of the relay 16. The secondary contacts of the scale relay are shorted and connected to normally open contact C' of the auxiliary relay. Also connected to C' is one side of operating coil 18 of the relay 17. Thus whenever either contacts A—A' or B—B' are closed, a circuit is completed through operating coil 18 of the relay 17.

The current to operating coil 18 is provided with an alternate flow path as soon as the contacts C—C' and D—D' close. This second circuit comprises L', A, B, normally closed contacts E—E', C—C', coil 18 and L². Were it not for the presence of this alternative circuit, current would cease to flow through the coil 18 as soon as the scale relay contacts opened. However, because of the provision of the alternate circuit, once the relay 17 has been actuated it can be reopened only by shutting off the current supply or by opening contacts E—E'.

L', contacts A, B and D and L², constitute the operating circuit for the coil 19 in relay 16. Since contacts A and B are shorted and since contacts D—D' continue to remain closed after initial actuation of relay 17 until the opening of contacts E—E', the diverter (timer) relay 16 is supplied with current through the circuit L', A, B, D—D', 19 and L² so long as the contacts E—E' remain closed. The operating circuit for coil 21 comprises L², coil 21, contacts F—F', contacts E, B, A and L'. This circuit is completed by the closing of contacts F—F' and occurs only for an instant during the brief moment between the time when contacts F—F' close and open. Although the operating circuit for coil 21 is broken almost as soon as it is first closed, the contacts H—H' remain closed for a somewhat longer interval due to the fact that the relay 20 is of a delayed opening type. Therefore, although the contacts G—G' open simultaneously with the de-energization of coil 21 the operating circuit for the solenoid valve 22 remains intact until contacts H—H' open. This is necessary because it takes somewhat longer to cycle the diverter mechanism than it does for contacts G—G' to close and open. The operating circuit for the solenoid valve includes L', contacts A, B, E, F, G, H—H', G', solenoid valve 22 and L² after contacts G—G' open.

Having described the various components of the automatic control system and the circuits linking said components, we shall now describe their operation in connection with that of the weigh conveyer and diverter. To properly comprehend the operation of this embodiment it is important to recognize that under normal circumstances (when no off-weight articles are on or have recently crossed the weight conveyer) contacts A—A', B—B', C—C', D—D', F—F', G—G', H—H' are open and contacts E—E' are closed.

Assume that an off-weight bag of carbon black is discharged from the packing machine onto the main conveyer. When the package reaches the scale relay, either contacts A—A' or contacts B—B' (depending on whether it is an over or underweight bag) will be closed on signal from the weigh conveyer 13. The closing of either contacts A—A' or B—B' energizes coil 18 which immediately closes contacts C—C' and D—D'.

Closure of the contacts C—C' establishes the alternate circuit for coil 18, so that when the overweight article leaves the weigh conveyer, opening contacts A—A', the coil 18 will remain in an energized condition. The closure of contacts D—D' immediately establishes a complete circuit through the coil 19 of diverter (timer) relay 16 with the result that the time cycle of said relay is initiated. All of the aforementioned actions and reactions occur while the off-weight object is still on or in very close proximity to the weigh conveyer.

The overweight article now passes further on down the conveyer towards the diverter and during such time the contacts E—E' remain closed while F—F' and G—G' remain open. The delay portion of the operating cycle of relay 16 is completed at substantially the same instant that the overweight package arrives at the center of the diverter mechanism. At this instant the contacts F—F' and G—G' are instantaneously tripped closed and contacts E—E' are opened at the same time or only a fraction of a second later. The opening and closing of the contacts E—E', F—F' and G—G' have various effects.

Closure of the contacts G—G' immediately energizes the solenoid valve 22 which is at such time a part of the completed circuit containing L', A, B, E, F, G, G', solenoid valve 22 and line $L^2$. Closure of the contacts F—F' initiates the operating cycle of reset relay 20 by completing the circuit L', A, B, E, F, coil 21 and $L^2$. Opening of the contacts E—E' breaks the alternate current supply circuit for the coil 18 with the result that relay 17 immediately opens and remains open until such time as it is re-energized by current from the scale relay in response to the presence of another off-weight package on the weigh conveyer.

Closure of the contacts F—F' energizes the reset relay 20, thus completing the secondary supply circuit for solenoid valve 22 which maintains said valve in an energized condition even after the breaking of its primary operating circuit by the opening of contacts G—G'. When a sufficient quantity of pressurized air to fully cycle the diverter mechanism has been delivered thereto, the reset timer contacts H—H' open, breaking the secondary supply circuit for the solenoid valve 22 and cutting off the air pressure; whereupon the diverter mechanism returns to normal condition. The entire system has now been returned to normal and awaits a signal from the weigh conveyer that another off-weight bag is present on the conveyer system.

The off-weight packages removed from the conveyer by the diverter may be allowed to fall into a chute or onto a gravity feed roller conveyer, or onto a driven belt conveyer. In the latter case, it may not be desirable for the conveyer to be in operation continuously, since few off-weight bags will result from a properly conducted filling operation. Therefore continual operation of the auxiliary conveyer would result in unnecessary wear upon said conveyer and the needless consumption of electric power to drive it when not in use. We have found that the above problem can be solved by providing additional automatic control means to limit the operation of the auxiliary conveyer only to such times as are necessitated by the discharge of an off-weight package from the main conveyer onto the auxiliary conveyer. The means required to bring about the necessary additional control are illustrated in FIGURE 2.

Referring now to FIGURE 2 it will be observed that certain of the components illustrated in FIGURE 1 are also present in FIGURE 2. The main conveyer 11, automatic bag packing machine 12, weigh conveyer 13, diverter 14, scale relay 15, auxiliary relay 17, diverter (timer) relay 16, operating coils 18 and 19, and solenoid valve 22 are common to both systems and cooperate with one another in the identical manner described above. The reset timer relay 20 of FIGURE 1, however, has been replaced in FIGURE 2 by a double pole, single throw reset timer relay 23.

Double pole, single throw relay 23 is provided with primary contacts $H^2$ and I and secondary contacts $H^3$ and I'. Contacts I—I' are normally closed. Relay 23 is also provided with an operating coil 21a. Operating coil 21a and contacts $H^2$ and $H^3$ in the relay 23 perform the same function and operate in the same manner as contacts H and H' and operating coil 21 in the relay 20 as depicted and described in connection with FIGURE 1.

Additional components have been added to the control system depicted in FIGURE 1: the auxiliary conveyer itself 29; a limit switch 130; reject conveyer motor 28; auxiliary conveyer relay 24, containing contacts J—J' and operating coil 25; the motor starter 26, containing operating coil 27 and contacts K—K', L—L', M—M', N—N' and O—O'; and a source of current for the reject conveyer motor, $L^3$, $L^4$ and $L^5$.

Reject conveyer 29 is located in a manner such that it receives discharged packages from the diverter mechanism. On or adjacent to conveyer 29 is located the limit switch 130 which, by virtue of its position, is able to sense and close in response to the diversion of a package from the main conveyer to the auxiliary conveyer 29.

Contacts I—I' in relay 23 are normally closed. Limit switch 130 and operating coil in auxiliary conveyer relay 24 are connected in series with contacts I—I' across L'—$L^2$ by a circuit comprising contacts L', A, B, E, F, G, $H^2$, I—I', 130, 25 and $L^2$. Thus whenever limit switch 130 is tripped and closed the operating circuit for coil 25 in the relay 24 is energized.

The function of auxiliary conveyer relay 24 is to control the motor starter and to de-energize the reject conveyer motor when the conveyer has had sufficient time to convey the rejected package from its point of discharge from the diverter mechanism to the location of the re-weighing operation or to another conveyer or storage place. The relay 24 is of the single pole, single throw type and has a delayed action feature. It is characterized by an operating cycle in which the contacts J—J': (1) normally remain open; (2) immediately close when the operating coil 25 is first energized; (3) remain closed for a predetermined length of time subsequent to the de-energization of operating coil 25; and (4) open automatically. The delay in the opening of said contacts should be equivalent to the length of time required to complete the transfer of package over the conveyer from the diverter mechanism to the point at which it is desired to stop the conveyer 29. The motor starter may be of any approved type and is available as a manufactured item, such as the G.E. Magnetic Starter No. CR 108 B004 with 2 heaters No. CR 123 CO.97A.

Up to a point, the operation of this embodiment of our invention is identical with the operation of the embodiment shown in FIGURE 1. Let it be assumed that an off-weight bag is discharged from the automatic packing machine. The system of FIGURE 2 operates in a manner identical to that shown in FIGURE 1 until contacts F—F' and G—G' are closed. As in the first-explained embodiment, closure of the contacts G—G' immediately energizes the solenoid valve 22 causing it to open. Opening of the contacts E—E' causes the relay 17 to open. However instead of energizing the reset relay 20, closure of the contacts F—F' energizes coil 21a in reset (timer) relay 23 causing normally open contacts H²—H³ therein to close immediately. Closure of the contacts H²—H³ provides a secondary supply circuit for the solenoid valve 22 which maintains said valve in an energized condition even after contacts G—G' open. Said secondary supply circuit includes L', A, B, E, F, G, H²—H³, G', valve 22 and L². When the diverter mechanism is fully cycled, contacts H²—H³ automatically open, breaking the secondary supply circuit for solenoid valve 22 which then cuts off the air pressure and allows the diverter mechanism to return to its retracted position. At the same time, the contacts I—I' which were open during the diverter mechanism cycle, return to their normally closed position. At this instant the rejected off-weight bag has left the diverter mechanism and is on its way to the auxiliary conveyer. The detector, diverter (timer) relay and diverter motor actuating means have now been returned to normal and await a signal from the weigh conveyer that another off-weight bag is present on the main conveyer.

Figure 7:
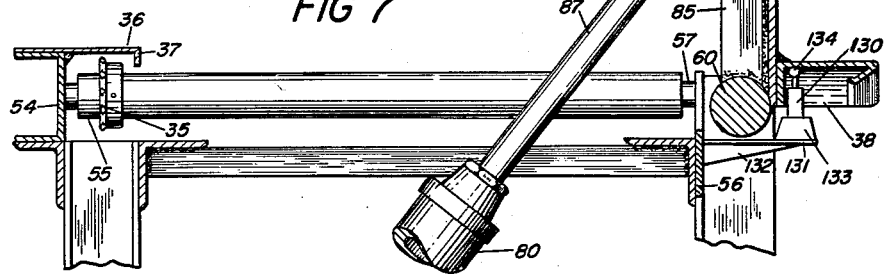
FIGURE 7 is a sectional view similar to FIGURE 4 except that the diverter mechanism is depicted with the ejector arms moved to the limit of their travel.

Diversion of the off-weight package to the auxiliary conveyer trips the normally open limit switch 130 establishing a circuit which energizes the operating coil 25 in relay 24. Said circuit includes L', contacts A, B, E, F, G, H², I—I', limit switch 130, coil 25 and L². Energization of coil 25 causes contacts J—J' to close immediately, whereupon the operating coil 27 of motor starter 26 is energized through a circuit comprising L³, contacts N—N', O—O', operating coil 27, contacts J—J' and L⁵. Reject conveyer motor 28 begins to drive the reject conveyer 29 when the contacts K—K', L—L' and N—N' are closed, connecting said motor to L³, L⁴ and L⁵. Although the limit switch 130 opens just as soon as the diverter begins to retract (see FIGURES 4 and 7) the delay feature of relay 24 causes the contacts J—J' to remain closed for a time sufficient to allow the rejected article to travel the desired distance on reject conveyer 29. At such time the contacts J—J' automatically open and the motor control 26 stops reject conveyer motor 28. The system is now ready to operate again whenever the diverter mechanism trips the limit switch 130.

The diverter mechanism which we prefer to utilize in connection with the above-described automatic control system is depicted in FIGURES 3–7. Our novel diverter mechanism also referred to as a conveyer stripper is adapted for use with a section of roller or wheel-type conveyer. However, the section of roller or wheel-type conveyer with which the diverter mechanism cooperates is available as a manufactured unit and may be utilized as one section of an over-all system comprising one or more different types of other conveyers such as belt conveyers. Therefore we have illustrated the invention in FIGURES 3–7 in conjunction with two belt conveyers, one of which feeds articles to a section of roller conveyer and the other of which carries away non-diverted articles. It should also be understood that the entire conveyer system might be composed of rollers and/or wheels.

Referring now specifically to FIGURE 3 a section of roller conveyer comprising a plurality of cylindrical rollers disposed in horizontal, parallel fashion are fed by a first belt conveyer 31 and emptied by a second belt conveyer 32. The belt conveyers 31 and 32 are wound about supporting rollers 33 and 34 respectively. The rollers 30, 33 and 34 are each provided with sprockets adapted for engagement with a motor driven drive chain (not shown) whereby all are kept rotating at a constant speed. In FIGURE 3 the sprocket ends of the rollers 30, 33 and 34 are hidden from view by a chain guard 36 which is disposed above the level of said rollers and over the sprockets 35. It is not essential that the rollers 30 be powered rollers, but it is in most cases desirable that they be driven. Therefore driven rollers are illustrated herein.

As shown in vertical section 4—4 (see FIGURE 4) the section of roller conveyer is supported on floor 39 by vertical posts 40, 41, 42 (FIGURE 5) and 43 (FIGURE 5), which are stabilized by longitudinal stringers 44, 45, 46, 47, 48 and 49. Additional rigidity is supplied by transverse beams 50, 51, 52 (FIGURE 5) and 53 (FIGURE 5). Each roller is supported at its sprocket end by the longitudinal beam 54 which rests upon stringer 48. On that end of each roller which is nearest its sprocket 35 there is a suitable shaft projection 55 which is journaled in bearings (not shown) within the beam 54 or within the roller itself so that the roller may rotate. The shaft projection 55 and sprocket 35 are covered and partially enclosed by beam 54, chain guard 36 and a depending lip 37 on the chain guard.

Figure 5:
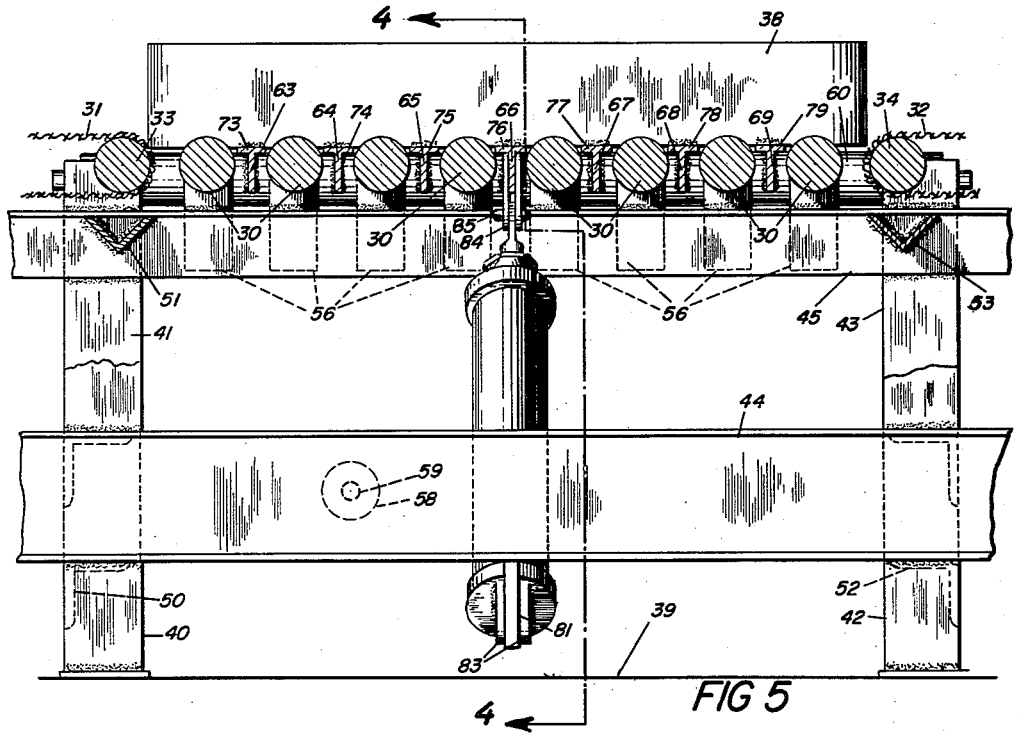
FIGURE 5 is a vertical, longitudinal section of the mechanism shown in FIGURE 3, the section being taken along section lines 5—5 in FIGURE 4.
Figure 6:
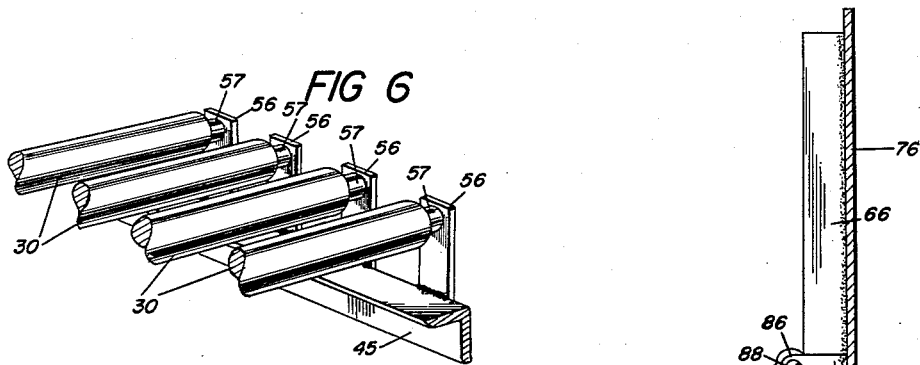
FIGURE 6 is a fragmentary perspective view of a portion of the roller conveyer shown in FIGURE 3, but with the diverter equipment removed.

The manner of supporting the opposite ends of the rollers 30 will be understood most easily by reference to FIGURES 5 and 6. Each of said opposite ends is provided with a suitable shaft projection 57 (hidden in FIGURE 5; visible in FIGURES 3 and 6). An individual stanchion 56, welded or otherwise secured in an upwardly projecting attitude to the back of longitudinal stringer 45, is provided for the support of each roller 30. The shaft projections 57 are journaled in bearings (not shown) either within or attached to each stanchion 56 or within each roller itself so that the rollers may rotate. The rollers 33 and 34 are supported at their sprocket ends by longitudinal beam 54 in the same manner as rollers 30. Unlike the rollers 30, rollers 33 and 34 are supported at their opposite ends by the vertical posts 41 and 43 respectively (see FIGURE 3).

Figure 4:
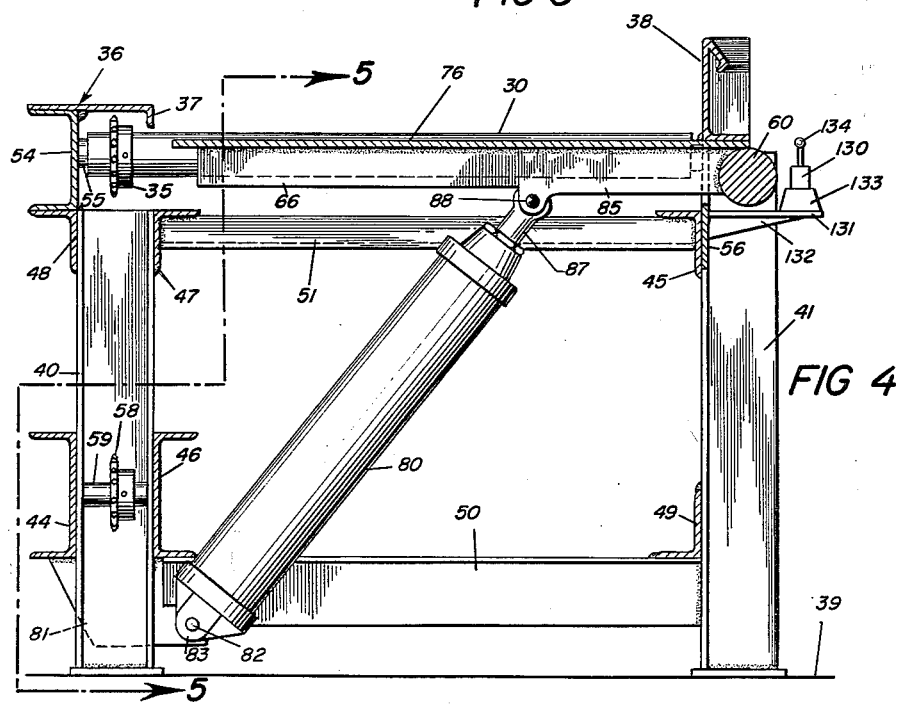
FIGURE 4 is a sectional view taken on section lines 4—4 in FIGURE 5.

An idler sprocket 58 appears in FIGURES 4 and 5. It is for the return of the drive chain (not shown) to the drive unit (not shown) after said chain passes over the sprockets 35 on rollers 30, 33 and 34. Sprocket 58 is supported between longitudinal stringers 44 and 46 on a horizontal shaft 59 which is journaled in suitable bearings (not shown) within said stringers.

The supporting framework, rollers and drive means therefor which are described above are not part of the present invention. They are explained only as a means for making the diverter mechanism more easily understandable by showing the type of conveyor with which our diverter mechanism is best adapted to cooperate. The diverter mechanism itself will be explained by reference to FIGURES 3, 4, 5 and 7.

As shown in FIGURE 3 a horizontally disposed shaft 60 is placed alongside the conveyor behind longitudinal stringer 45 and stanchions 56 (not visible in FIGURE 3; see FIGURE 5). It may be supported in any convenient manner, such as by journaling its stub shafts 61 and 62 in bearings (not shown) in vertical posts 41 and 43 respectively, so that the shaft 60 is free to rotate but not free to move longitudinally. Secured to the shaft 60 and interposed between the stanchions 56 are a plurality of ejector arms 63–69 which project from shaft 60 into the spaces between adjacent rollers 30 across a substantial portion of the width thereof. It is also desirable, but not essential, to provide a plurality of horizontal face plates 73–79 which are secured atop the ejector arms 63–69.

A preferred method of assembling the shaft 60, face plates 73–79 and ejector arms 63–69 is depicted herein and most clearly visible in FIGURES 4 and 5. The upper surfaces of arms 63–69 all lie in a plane which is tangential to the uppermost surface of shaft 60. One end of each arm may be welded or otherwise secured to the curved surface of the shaft 60. The face plates lie atop the arms and are welded thereto and to the surface of shaft 60 so that said arms and plates comprise a T-shape in cross section (see FIGURE 5). It should be observed that the placement of shaft 60 and the thickness of the face plates 73–79 are such that the upper surfaces of said plates lie somewhat below the plane of the load-bearing surfaces of the rollers 30 and conveyer belts 31 and 32. FIGURES 3, 4 and 5 show the diverter in its retracted position and the purpose of placing the face plates below the load-bearing surface of the conveyer is to insure that the diverter will not interfere with normal packages traversing the rollers 30. A fence 38 may be provided outboard of the rollers 30 and atop the face plates 73–79 where it may be secured by welding, so that as the shaft 60 is rotated about its longitudinal axis, fence 38, arms 63–69 and face plates 73–79 move in unison.

The required energy for the article-diverting movement of the above-described assembly may be derived from any suitable motor means such as an electric motor and gear train, hydraulic cylinder, etc. but we prefer to employ a pneumatic cylinder 80 because of the rapid action which can be achieved therewith. The cylinder may be secured to the conveyer or other framework. For instance, it may be attached to the longitudinal stringers 44 and 46 by a downwardly and inwardly projecting bracket 81 secured to the undersides of said stringers by welding or any other suitable method. The bracket 81 carries a short transverse shaft 82 which passes through each arm 83 of a bifurcated mounting on the bottom end of said cylinder. It is desirable when traffic is heavy on the main conveyer to utilize a double acting air cylinder with a positive retract to avoid interference with incoming articles. However, such expedients are well known by those skilled in the art and are therefore not illustrated herein.

The thrust of the cylinder is transferred to the shaft 60 through a pair of levers 84 and 85, one of which is secured to each side of the ejector arm 66. Each of said levers is welded at one end to the shaft 60 and is provided at its other end with a shoulder 86 which extends lower than the bottom surface of the arm 76. The two shoulders 86 form a clevis in which the plunger 87 of pneumatic cylinder 80 is pivotably secured by a short pin 88.

The operation of the diverter mechanism is relatively simple. When an article is on the rollers 30 with its center of gravity within the confines of the space above the face plates 73–79, it may easily be discharged by actuating the pneumatic cylinder by admitting pressurized air thereto through a supply hose (not shown). As air is admitted to the cylinder, the plunger extends rapidly, forcing the arms 63–69 and face plates 73–79 upwardly in an arcuate path as shaft 60 rotates. The face plates 73–79 rise quickly beneath the moving article from their normal position below the load-bearing surface of the conveyer and engage said article immediately. As a result of being lifted clear of the conveyer the forward movement of the article along the conveyer is checked. The plunger continues to extend rapidly until the ejector arms have transversed an arc of approximately 90°. During this movement, depending upon its rapidity, the mass of the rejected article and its coefficient of friction with the face plates 73–79, part or all of the weight of the rejected article will come to rest upon the fence 38 which approaches the horizontal as the ejector arms approach the vertical. As the ejector arms reach their limit of travel in a vertical attitude, the momentum of the rejected article causes it to persist in its motion and topple from the horizontal fence into a waiting hopper, chute conveyor or other machine.

When the diverter mechanism is utilized in connection with a system such as that shown in FIGURE 2, the limit switch 130 may be mounted in a variety of ways, such as by placing trip linkage in the path followed by an article discharged from the diverter to operate said switch when said linkage is tripped, or by spring-mounting the frame of the auxiliary conveyer and connecting the limit switch thereto so that the impact on an article upon the auxiliary conveyer closes said switch. These expedients are well known to those skilled in the art. We prefer, however, to position the limit switch so that it is closed by contact with the back of the fence 38 when the diverter reaches its limit of travel while diverting an article. A horizontal plate 131 is supported behind horizontal longitudinal stringer 45 by a triangular brace 132 attached to said stringer. Upon the outer end of said plate is a mounting pad 133 atop which is located limit switch 130. In this embodiment, said switch takes the form of a normally off-plunger-type switch having a perpendicularly disposed plunger 134 biased to its fully extended (off) position by a return spring in the switch housing. The switch is held at a sufficient elevation by the pad 133 so that whenever the diverter reaches its fully extended position, the fence 38 rotates into contact with said switch and depresses the plunger 134 (see FIGURE 7) just far enough to close said switch without damaging it. When the fence 38 retracts with the diverter, it disengages plunger 134 allowing the return spring in the switch housing to reopen switch 130.

Modifications entirely consistent with the scope and spirit of this invention will suggest themselves to those skilled in the art. For instance the fence 38 could be eliminated entirely without departing from the essence of our invention. It is desirable because it prevents unrejected articles from slipping off one side of the conveyer while crossing it. It also prevents an article which is in the process of being rejected from prematurely toppling or sliding off the face plates. On the other hand if the diverter discharges articles into a chute, wagon or container, it is sometimes desirable for the rejected article to slide rather than to topple from the diverter mechanism. In such a case it will be necessary to omit the fence 38 and to decrease the angle subtended by the retracted and fully extended positions of the ejector arms.

Automatic actuation of the diverter mechanism is achieved in the system described in connection with FIGURES 1 and 2 herein by means of a normally closed solenoid valve 22 which, when energized, transmits air under pressure to the diverter mechanism, or, more specifically, to the pneumatic cylinder 80.

It should be obvious to those skilled in the art that if some other motor means were substituted for the pneumatic cylinder it would probably be necessary to eliminate or substitute some other type of device for the solenoid valve. For instance, if an electric motor and gear train replaced the pneumatic cylinder 80, it might be necessary to put the electric motor itself into the control circuit in place of the solenoid valve or to replace solenoid valve 22 with a transformer to match said electric motor to the voltage of $L'—L^2$.

Those skilled in the art will readily recognize that many products are sold, inspected or packaged according to weight and that specialized machinery has been developed for the various types of products depending upon their peculiar properties and needs. An exhaustive listing of such products would be lengthy however and a few examples should suffice. It is current practice to control bag, package or container content by weight measure in connection with products such as paint, cement, small items of hardware, food, detergents, solvents, lubricants, adhesives, money, agricultural products, fertilizer and many others. Obviously, there would be no departure from the spirit of this invention in utilizing its basic principles in connection with some product other carbon black while substituting for said bag-filling machine another "source" machine adapted to treat, package, inspect or otherwise handle the product.

Furthermore it is often desirable to continuously check articles on a conveyer for some property other than weight such as conductivity, light absorption, magnetism and remove from the conveyer without interrupting its operation those articles which are "off-standard" or deviate from predetermined minimum and/or maximum standards of the monitored property. In such a case the weigh conveyer might be replaced by a photocell circuit to measure absorption of light, for example, or by an inductance coil and trigger circuit to detect the presence of undesired "trash" metal in a closed container of packaged material passing along the conveyer. Therefore the specific embodiment described herein should be regarded as exemplary only and should not be construed as unnecessarily limiting the following claims.

We claim:

1. Grading apparatus for sorting articles by weight, comprising: a conveyer system adapted to continuously carry a procession of such articles through weight measuring and diverting operations without interruption of motion; an electrically actuated diverter system associated with the conveyer for diverting moving off-weight articles therefrom; an electrical control circuit for operating said diverter mechanism, said circuit being connectable to a suitable source of electric current; a weigh conveyer associated with said conveyer system upstream of said diverter mechanism for weighing the moving articles; normally open switch means in said circuit, adapted to close momentarily in response to passage of an off-weight article over said weigh conveyer, thus producing a momentary flow of current in said circuit; self-locking auxiliary relay means in said circuit responsive to said momentary flow of current for prolonging said current until said self-locking auxiliary relay means is shut off; diverter-timer relay means in said circuit and responsive to said prolonged current to provide at such time as the off-weight article reaches the diverter mechanism, a current for energizing said diverter mechanism; means in said diverter-timer relay means for unlocking said self-locking relay means simultaneous with the energization of said diverter mechanism, whereby off-weight articles may be removed from the conveyer without stopping the conveyer and without impeding the progress of articles of an acceptable weight.

2. Grading apparatus for sorting articles by weight, comprising: a conveyer system adapted to continuously carry a procession of such articles through weight measuring and diverting operations without interruption of motion; an electrically actuated diverter system associated with the conveyer for diverting moving off-weight articles therefrom; an electrical control circuit for operating said diverter mechanism, said circuit being connectable to a suitable source of electric current; a weigh conveyer associated with said conveyer system upstream of said diverter mechanism for weighing the moving articles; normally open switch means in said circuit, adapted to close momentarily in response to passage of an off-weight article over said weigh conveyer, thus producing a momentary flow of current in said circuit; self-locking auxiliary relay means in said circuit for prolonging said flow of current for at least that period of time which is required for the off-weight article to pass from the weigh conveyer over the conveyer system within reach of the diverter mechanism; diverter-timer relay means in said circuit and responsive to said prolonged signal, to provide a current for operating said diverter mechanism at the expiration of said time period, whereby off-weight articles may be removed from the conveyer without stopping the conveyer or impeding the progress of articles of acceptable weight.

3. Grading apparatus according to claim 2 which includes means for unlocking said self-locking means simultaneous with the energization of said diverter mechanism.

4. Grading apparatus according to claim 2 which includes a reset timer-relay for prolonging the current output of said diverter-timer relay means.

5. Grading apparatus according to claim 2 which includes a reject conveyer and automatic means for operating said reject conveyer in response to the diversion of an off-weight article from said conveyer means to said reject conveyer.

References Cited in the file of this patent

UNITED STATES PATENTS

| | | |
|---|---|---|
| 2,169,897 | Lueckel | Aug. 15, 1939 |
| 2,623,626 | Ditolla | Dec. 30, 1952 |
| 2,959,302 | Cawood | Nov. 8, 1960 |
| 3,006,469 | Craig | Oct. 31, 1961 |

FOREIGN PATENTS

| | | |
|---|---|---|
| 615,430 | Germany | July 5, 1935 |